United States Patent

Shoji et al.

[11] Patent Number: 5,248,572
[45] Date of Patent: Sep. 28, 1993

[54] LAYERED-TYPE MANGANESE DRY BATTERY

[75] Inventors: Yasuhiko Shoji, Higashiosaka; Kazuo Sugino; Tadayoshi Maeda, both of Hirakata; Tomoo Nomura, Kashiwara, all of Japan

[73] Assignee: Matsushita Electric Industrial Co., Ltd., Osaka, Japan

[21] Appl. No.: 865,797

[22] Filed: Mar. 30, 1992

Related U.S. Application Data

[63] Continuation-in-part of Ser. No. 679,788, Apr. 3, 1991, abandoned.

[30] Foreign Application Priority Data

Apr. 6, 1990 [JP] Japan .................. 2-92416

[51] Int. Cl.$^5$ ............................. H01M 4/70
[52] U.S. Cl. ...................... 429/209; 429/235; 427/122
[58] Field of Search .......... 429/137, 209, 232, 235; 427/122; 29/623.5

[56] References Cited

U.S. PATENT DOCUMENTS

| | | | |
|---|---|---|---|
| 3,565,694 | 2/1971 | Chireau | 429/232 X |
| 4,407,915 | 10/1983 | Brown | 429/232 X |
| 4,960,655 | 10/1990 | Hope et al. | 429/209 X |

FOREIGN PATENT DOCUMENTS 0840712 6/1952 Fed. Rep. of Germany.
0219769 8/1924 United Kingdom.

OTHER PUBLICATIONS

Search Report for EPO application No. EP-91105305.6, dated Jul. 25, 1991.

*Primary Examiner*—Stephen Kalafut
*Attorney, Agent, or Firm*—Ratner & Prestia

[57] ABSTRACT

Each bonded electrode of the layered-type manganese dry battery has a conductive carbon coat the surface of which contacts the adjacent positive electrode composition and is provided with protrusions of 0.05 to 0.15 mm in height, which serves to prevent the electrodes from sticking to each other even when the electrodes are punched into a prescribed shape by a press mounted with a chute and transported by pressure with the top and bottom of the electrodes facing the respectively specified sides. The protrusions formed on the surface of the coat stick into the positive electrode composition, which serves to reduce the contact resistance with the positive electrode composition, facilitating the easy maintenance of the low contact resistance. Furthermore, since the contact area with the positive electrode composition facing the coat is increased, the current collecting performance is also improved.

4 Claims, 3 Drawing Sheets 5,248,572

LAYERED-TYPE MANGANESE DRY BATTERY

This application is a continuation-in-part of application Ser. No. 07/679,788 filed Apr. 3, 1991 now abandoned.

BACKGROUND OF THE INVENTION

1. Field of the Invention:

The present invention relates to a layered-type manganese dry battery. More particularly, it relates to a conductive carbon coat, the surface of which is physically treated, the said conductive carbon coat constituting a zinc-carbon bonded electrode (hereinafter referred to as the "bonded electrode") used in a layered manganese dry battery, and to a layered-type manganese dry battery using the bonded electrode.

2. Description of the Prior Art:

Generally, a layered-type manganese dry battery, which is typified by the 6F22 type, has a structure as shown in FIG. 1, in which six unit cells 7 with a positive current collector plate 5 stacked on top of them are held together, coated with wax, and covered with a PVC tube 4, the contents thus contained in the PVC tube 4 being temporarily clamped in an outer can 10 with a terminal plate 3 and a bottom plate 9 disposed at the top and bottom, respectively. A positive electrode lead plate 6 is disposed on the positive current collector plate 5, and a negative electrode lead plate 8 is disposed at the bottom of the six unit cells 7. A positive electrode terminal 1 and a negative electrode terminal 2 are disposed on the terminal plate 3.

Each unit cell 7 comprises, as shown in FIG. 2, a bonded electrode 14 made of a conductive carbon coat 15 integrally bonded to a zinc plate 16, a positive electrode composition 11, and a separator 13, which separates the bonded electrode 14 from the positive electrode composition 11, all of these being contained in a cell grommet of a PVC tube 12.

The bonded electrode of a conventional layered-type manganese dry battery has the structure shown in FIG. 6, which is composed of a conductive carbon coat 15 and a zinc plate 16. The conventional bonded electrode is manufactured by either applying a conductive carbon paint to form a conductive carbon coat 15 on one side of the zinc plate 16 that serves as the negative electrode, or by press-fitting the conductive carbon coat 15 onto the zinc plate 16. In the latter case, a flexible sheet-like material, which is made of a synthetic resin and a large quantity of carbon powder mixed together into a paste and rolled into a thin film by a press roller, has been used as the conductive carbon coat 15. The thus formed conductive carbon coat 15 has a smooth surface like that of a reduction roll rolled into a sheet-like form by the heat press roller.

The conventional bonded electrode with the above-mentioned structure has the following problem when the zinc sheet that has been bonded to the conductive carbon coat is punched into a prescribed shape by a press. That is, when a chute is installed below the die of the press in order to enhance the work efficiency in transporting the bonded electrodes from the press to the next process, if the bonded electrodes are continuously fed through the chute by the pressure of the press so that the bonded electrodes are aligned properly in the chute with their top and bottom surfaces facing the respectively specified sides, the bonded electrodes will become firmly pressed together and stick to each other via the soft conductive carbon coat, thus causing the problem that they do not separate from each other when delivered to the next process.

To avoid this problem, the previous method to prevent the electrodes from sticking to each other was by attaching paper to the surface of the zinc plate or to avoid application of pressure by punching the electrodes one by one without using a chute.

Moreover, the layered-type manganese dry battery has such a structure that more than one unit cell of the same type is stacked one above another to obtain a high output voltage. In such a battery, it is required to reduce the contact resistance between the unit cells and to maintain the low contact resistance not only during discharge but also when the battery is out of use and stored on a shelf. It is also required, particularly under a high load discharge condition, that the conductive carbon coat has the largest possible conductivity and current collecting property within a limited contact area.

SUMMARY OF THE INVENTION

The layered-type manganese dry battery of the present invention, which overcomes the above-discussed and numerous other disadvantages and deficiencies of the prior art, comprises a positive electrode composition, formed in a pellet shape, consisting essentially of manganese dioxide, conductive material, and electrolyte; a separator of a cup-like shape surrounding the positive electrode composition, said separator absorbing and holding the electrolyte by itself; and a zinc-carbon bonded electrode 14 made of a conductive carbon coat 15 integrally bonded to a flat zinc negative electrode 16 facing the positive electrode composition so as to sandwich the separator therebetween, the zinc-carbon bonded electrode 14 being provided with protrusions 17 on the surface of the conductive carbon coat 14 formed on the outer surface of the flat zinc negative electrode 16.

In a preferred embodiment, the protrusions formed on the surface of the conductive carbon coat have a height of 0.05 to 0.15 mm.

Alternatively, the layered-type manganese dry battery of the present invention comprises a positive electrode composition, formed in a pellet shape, consisting essentially of manganese dioxide, conductive material, and electrolyte; a separator of a cup-like shape surrounding the positive electrode composition, said separator absorbing and holding the electrolyte by itself; and a zinc-carbon bonded electrode 14 made of a conductive carbon coat 15 integrally bonded to a flat zinc negative electrode 16 facing the positive electrode composition so as to sandwich the separator therebetween, the zinc-carbon bonded electrode 14 being provided with protrusions 17 on the surface of the conductive carbon coat 15 of 0.10 to 0.30 mm thickness formed of a synthetic resin and carbon powder on the outer surface of the flat zinc negative electrode 16, the protrusions 17 having a height of 30 to 70% of the thickness of the carbon coat.

The method of manufacturing a zinc-carbon bonded electrode 14 for use in the layered-type manganese dry battery of the present invention, which overcomes the above-discussed and numerous other disadvantages and deficiencies of the prior art, comprises bonding a conductive carbon coat 15 formed of a synthetic resin and carbon powder in an integral fashion to one side of a zinc sheet, forming protrusions 17 on the surface of said conductive carbon coat 15, and punching said integrally bonded conductive carbon coat 15 into a prescribed shape by press.

Alternatively, the method of manufacturing a zinc-carbon bonded electrode 14 for use in the layered-type manganese dry battery of the present invention comprises forming protrusions 17 on the surface of a conductive carbon coat 15 formed of a synthetic resin and carbon powder, bonding said conductive carbon coat 15 provided with the protrusions 17 on the surface thereof in an integral fashion to one side of a zinc sheet, and punching said integrally bonded conductive carbon coat 15 into a prescribed shape by press.

As shown in FIG. 7, a method of manufacturing a bonded electrode according to the present invention is as follows:

The zinc sheet 18 and the conductive carbon coat 19 are unwound at a fixed velocity and at the same time one side of the conductive carbon coat 19 is uniformly covered with the adhesive 21 by the coating roller 20. Then, the adhesive coated conductive carbon sheet 19 and the zinc sheet 18 are stuck together by the pressing roller 22. The surface of the conductive carbon coat is provided with protrusion by the protruding roller 23. They are finally wound up by the take-up device 24.

Thus, the invention described herein makes possible the objectives of (1) providing a layered-type manganese dry battery in which bonded electrodes are prevented from sticking to each other when they are punched into a prescribed shape by a press; (2) providing a layered-type manganese dry battery in which a contact resistance between the conductive carbon coat of the bonded electrode and the positive electrode composition is reduced in a layered manganese and the low contact resistance is maintained; and (3) providing a layered-type manganese dry battery that attains an excellent current collecting performance particularly under high load discharging.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The present invention provides a layered-type manganese dry battery that is manufactured by bonding a conductive carbon coat to a zinc plate in an integral fashion and then roughing the surface of the conductive carbon coat that comes into contact with the positive electrode composition of the bonded electrode, or by bonding a conductive carbon coat which surface has been roughened in advance, to a zinc plate in an integral fashion.

The roughing of the surface is accomplished, for example, by press-forming the soft conductive carbon surface by a press roller having an embossed roller face, to form the surface with a pattern of protrusions having a 0.05 to 0.15 mm height.

As compared with a conventional method, when the bonded electrodes are punched into a prescribed shape by a press with a chute installed to its die, the pattern of protrusions serves to reduce the press-contact area between the bonded electrodes, and also to secure the air flow between the adjacent bonded electrodes in the chute. As a result, the bonded electrodes are less likely to stick to each other.

Moreover, since the protrusions on the roughened surface of the conductive carbon cost stick into the adjacent positive electrode composition, the contact resistance is reduced with a resultant reduction in the internal resistance of the battery. Furthermore, with the protrusions sticking into the positive electrode composition, it is easy to maintain the initial contact resistance regardless of the volume change of the positive electrode composition caused during discharging.

Moreover, since the roughened surface of the conductive carbon coat serves to increase the contact area with the positive electrode composition of the adjacent unit cell, the current collecting property is also enhanced.

Referring to the accompanying drawings, we will now describe the preferred embodiments of the present invention by way of example using a conductive carbon coat with a thickness of 0.02 mm made of a paste of the mixture shown in Table 1.

EXAMPLE 1

Figure 1:
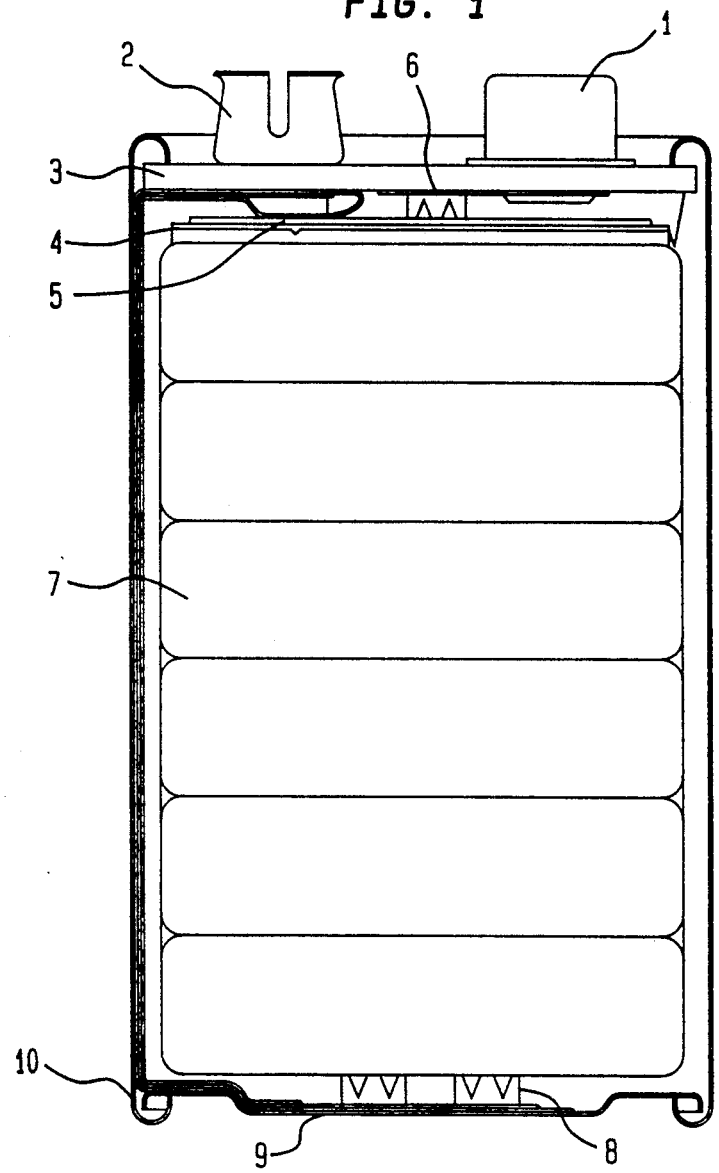
FIG. 1 is a cross sectional view of a layered-type manganese dry battery of 6F22 type manufactured in accordance with the present invention.
Figure 2:
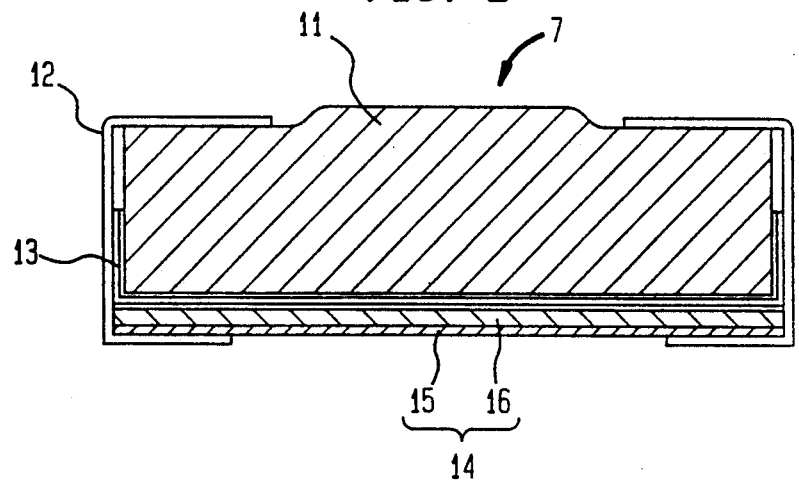
FIG. 2 is a cross sectional view of a unit cell constituting part of the layered-type manganese dry battery shown in FIG. 1.
Figure 3:
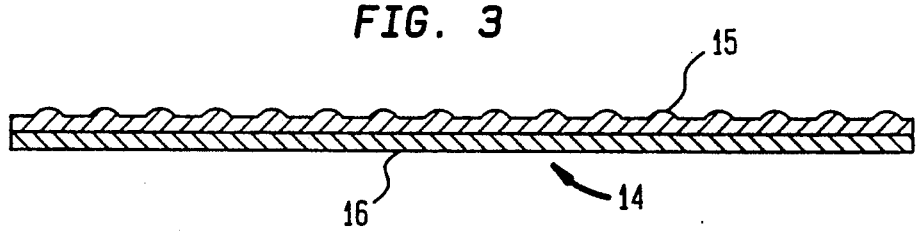
FIG. 3 is a cross sectional view of a bonded electrode according to one embodiment of the present invention.
Figure 4:
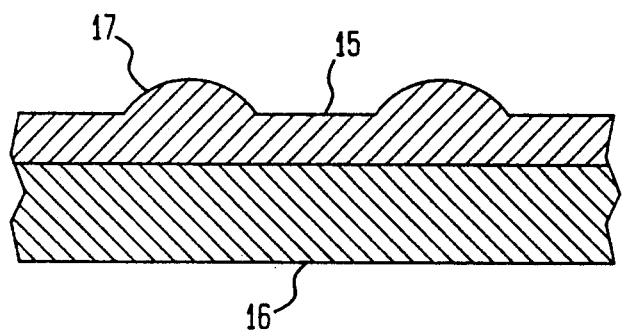
FIG. 4 is a front view of an enlarged portion of the bonded electrode of FIG. 3.
Figure 5:
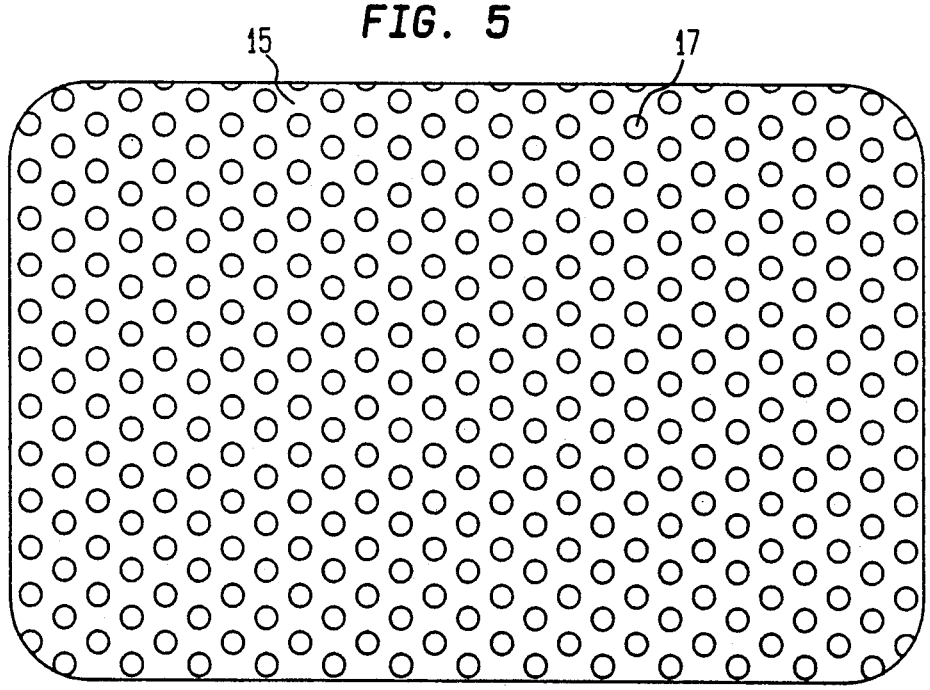
FIG. 5 is a front view of the bonded electrode of FIG. 4 viewed from the conductive carbon coat side.
Figure 6:
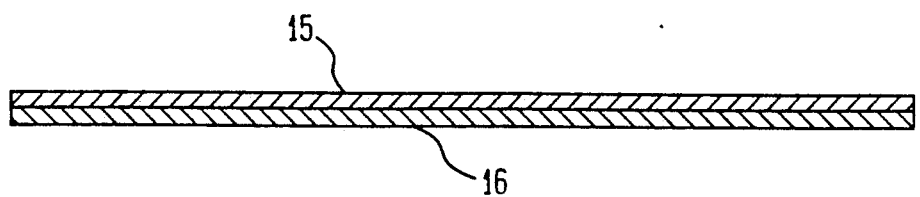
FIG. 6 is a cross sectional view of a conventional bonded electrode.
Figure 7:
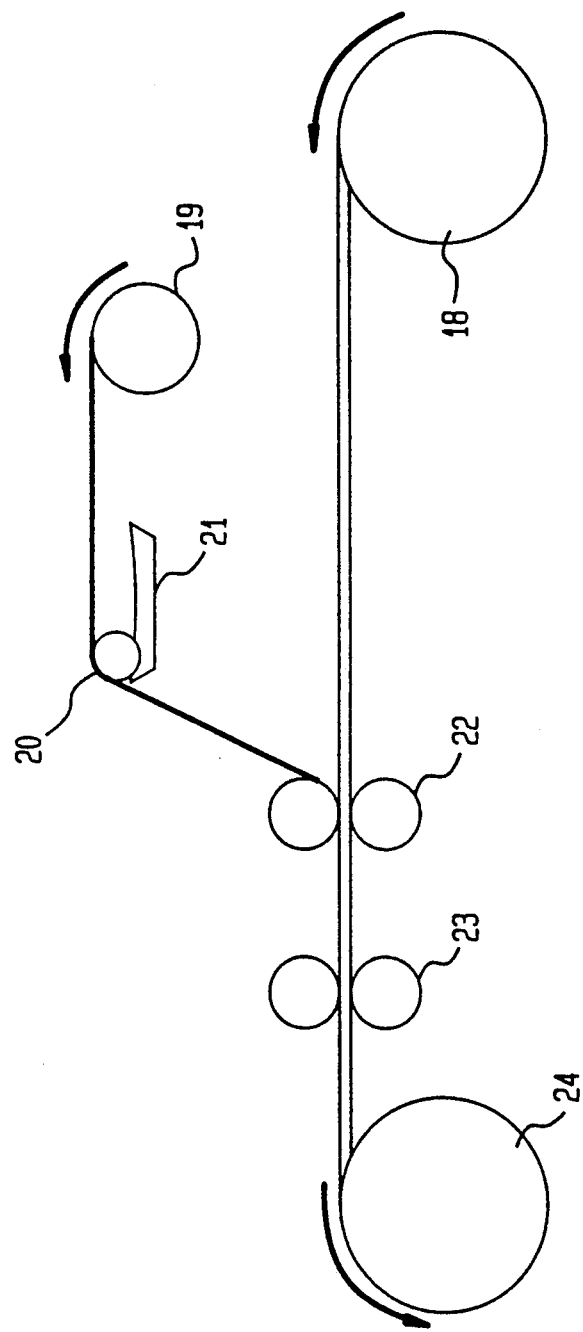
FIG. 7 is a schematic diagram showing a method of manufacturing a bonded electrode according to the present invention.

A 6F22 type dry battery comprising cells each having a bonded electrode which, as shown in FIGS. 3 to 5, is made of a conductive carbon coat 15 integrally bonded to a zinc plate 16, the surface of the conductive carbon coat 15 being treated so as to form thereon a pattern of semispherically-shaped protrusions 0.16 mm in height and 0.5 mm in diameter arranged at intervals of 0.5 mm.

EXAMPLE 2

A 6F22 type dry battery comprising cells each having a bonded electrode of Example 1, wherein the surface of the conductive carbon coat 15 is treated so as to form thereon a pattern of protrusions 0.14 mm in height.

EXAMPLE 3

A 6F22 type dry battery comprising cells each having a bonded electrode of Example 1, wherein the surface of the conductive carbon coat 15 is treated so as to form thereon a pattern of protrusions 0.12 mm in height.

EXAMPLE 4

A 6F22 type dry battery comprising cells each having a bonded electrode of Example 1, wherein the surface of the conductive carbon coat 15 is treated so as to form thereon a pattern of protrusions 0.10 mm in height.

EXAMPLE 5

A 6F22 type dry battery comprising cells each having a bonded electrode of Example 1, wherein the surface of the conductive carbon coat 15 is treated so as to form thereon a pattern of protrusions 0.08 mm in height.

EXAMPLE 6

A 6F22 type dry battery comprising cells each having a bonded electrode of Example 1, wherein the surface of the conductive carbon coat 15 is treated so as to form thereon a pattern of protrusions 0.06 mm in height.

EXAMPLE 7

A 6F22 type dry battery comprising cells each having a bonded electrode of Example 1, wherein the surface of the conductive carbon coat 15 is treated so as to form thereon a pattern of protrusions 0.04 mm in height.

EXAMPLE 8

A 6F22 type dry battery comprising cells each having a bonded electrode of Example 1, wherein the surface of the conductive carbon coat 15 is treated so as to form thereon a pattern of protrusions 0.02 mm in height.

COMPARATIVE EXAMPLE

A 6F22 type dry battery comprising cells each having a conventional bonded electrode with no roughing treatment on the surface of the conductive carbon coat 15.

TABLE 1

| materials | proportion (parts) |
| --- | --- |
| carbon powder | 75 |
| butyl rubber | 23 |
| plasticizer | 2 |

TABLE 2

| | Height of protrusions | Internal resistance (the number of samples is 20) | 50 mA constant continuous discharge current (the number of samples is 5) | The number of abnormal discharge when discharged with a 620 Ω load for 2 hours per day |
| --- | --- | --- | --- | --- |
| Example 1 | 0.16 mm | 9.3 Ω | 255 min | 0 out of 20 |
| Example 2 | 0.14 mm | 9.5 Ω | 252 min | 0 out of 20 |
| Example 3 | 0.12 mm | 9.4 Ω | 250 min | 0 out of 20 |
| Example 4 | 0.10 mm | 9.4 Ω | 248 min | 0 out of 20 |
| Example 5 | 0.08 mm | 9.9 Ω | 241 min | 0 out of 20 |
| Example 6 | 0.06 mm | 9.9 Ω | 223 min | 1 out of 20 |
| Example 7 | 0.04 mm | 10.5 Ω | 210 mn | 2 out of 20 |
| Example 8 | 0.02 mm | 11.0 Ω | 195 min | 4 out of 20 |
| Comparative example | 0.0 mm | 11.3 Ω | 198 min | 5 out of 20 |

Table 2 shows the results of experiments conducted on the dry batteries described in Examples 1 to 8 of the present invention and in comparative example, the results showing the internal resistance, the continuous discharge time with 50 mA constant current (until the voltage drops to 5.4 V), and the number of batteries, out of 20 batteries in each example, which suffered abnormal discharge due to contact failure between the unit cells when discharged with a load of 620 Ω for two hours per day after three months' storage at 45° C..

As is apparent from Table 2, the present invention attains the effect that the contact resistance between the positive electrodes composition and the conductive carbon coat is reduced, significantly increasing the discharge performance under a high load discharge condition. Moreover, since the protrusions formed on the surface of the conductive carbon coat stick into the positive electrodes composition of the adjacent unit cell, a good contact resistance can be maintained during discharge, the effect being particularly remarkable in discharging after storage.

These effects are remarkable in Examples 1 to 6, but not appreciable effects have been noted in Examples 7 and 8 in which the surface of the conductive carbon coat has lower protrusions. On the other hand, when the protrusions of a height greater than 0.16 mm are provided, the breakage of the conductive carbon coat occurs, which is not desirable in constructing the battery.

Furthermore, in Examples 1 to 5, it was found that when bonded electrodes are manufactured by punching with a press to which a chute is installed, no adhesion occurs between the bonded electrodes, the bonded electrodes come out separated from each other, facilitating smooth delivery to the next process.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A layered-type manganese dry battery comprising a plurality of unit cells stacked one above another to form a cell stack, each unit cell comprising:

a positive electrode composition, formed in a pellet shape, consisting essentially of manganese dioxide, conductive material, and electrolyte;

a separator of a cup-like shape surrounding the positive electrode composition, said separator absorbing and holding the electrolyte by itself; and a zinc-carbon bonded electrode made of a conductive carbon coat integrally bonded to a flat zinc negative electrode facing the positive electrode composition so as to sandwich the separator therebetween, the zinc-carbon bonded electrode being provided with protrusions on the surface of the conductive carbon coat formed on the outer surface of the flat zinc negative electrode, wherein the protrusions formed on the surface of the conductive carbon coat have a height of 0.05 to 0.15 mm.

2. A layered-type manganese dry battery comprising a plurality of unit cells stacked one above another to form a cell stack, each unit cell comprising:
- a positive electrode composition, formed in a pellet shape, consisting essentially of manganese dioxide, conductive material, and electrolyte;
- a separator of a cup-like shape surrounding the positive electrode composition, said separator absorbing and holding the electrolyte by itself; and
- a zinc-carbon bonded electrode made of a conductive carbon coat integrally bonded to a flat zinc negative electrode facing the positive electrode composition so as to sandwich the separator therebetween, the zinc-carbon bonded electrode being provided with protrusions on the surface of the conductive carbon coat of 0.10 to 0.30 mm thickness formed of a synthetic resin and carbon powder on the outer surface of the flat zinc negative electrode, the protrusions having a height of 30 to 70% of the thickness of the carbon coat.

3. A method of manufacturing a zinc-carbon bonded electrode for use in a layered-type manganese dry battery comprising bonding a conductive carbon coat formed of a synthetic resin and carbon powder in an integral fashion to one side of a zinc sheet, forming protrusions on the surface of said conductive carbon coat, and punching said integrally bonded conductive carbon coat into a prescribed shape by press.

4. A method of manufacturing a zinc-carbon bonded electrode for use in a layered-type manganese dry battery comprising forming protrusions on the surface of a conductive carbon coat formed of a synthetic resin and carbon powder, bonding said conductive carbon coat provided with the protrusions on the surface thereof in an integral fashion to one side of a zinc sheet, and punching said integrally bonded conductive carbon coat into a prescribed shape by press.

* * * * *